May 3, 1966     M. G. KAUFMAN     3,249,943
CHANNEL COMBINER FOR SPACE SURVEILLANCE SYSTEM
Filed Sept. 30, 1963
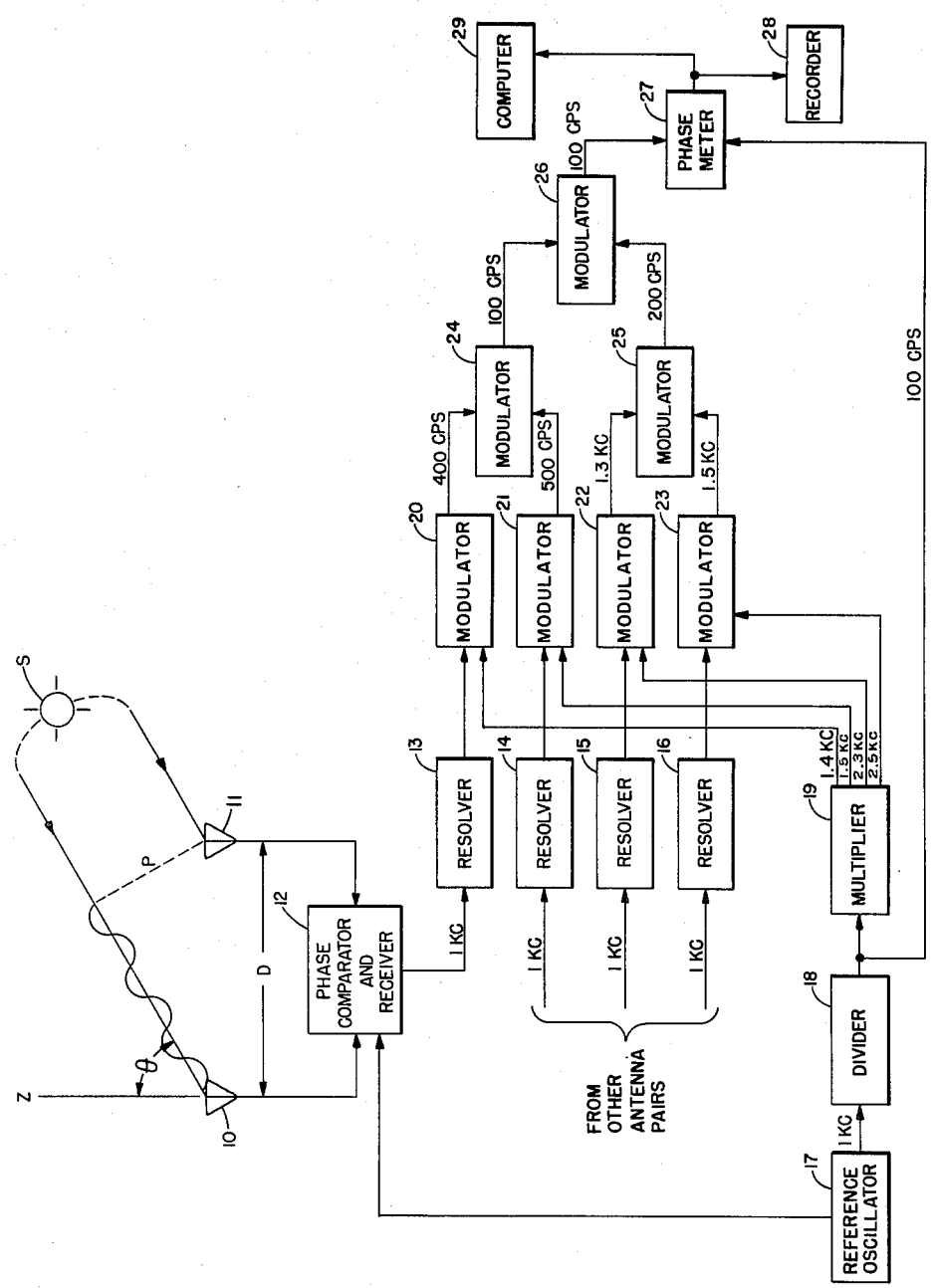
INVENTOR
MAXIME G. KAUFMAN
BY James G. Murray    AGENT
Richard G. Reed
ATTORNEY United States Patent Office  3,249,943
Patented May 3, 1966

3,249,943
CHANNEL COMBINER FOR SPACE
SURVEILLANCE SYSTEM
Maxime G. Kaufman, Camp Springs, Md., assignor to the United States of America as represented by the Secretary of the Navy
Filed Sept. 30, 1963, Ser. No. 312,798
5 Claims. (Cl. 343—113)

The invention described herein may be manufactured and used by or for the Government of the United States of America for governmental purposes without the payment of any royalties thereon or therefor.

The present invention relates generally to improvements in space surveillance and the like and more particularly to new and improved apparatus for measuring the angle of arrival of the reflected signal from a satellite wherein the outputs of a plurality of phase data channels are combined into a single output which is representative of the satellite position.

As a result of the increasing number of objects in orbit around the earth, much effort has been made in developing surveillance systems which provide information concerning the location, velocity and other flight characteristics of the satellite. These systems conventionally use compound radio interferometer techniques since narrow beam, "pointing," antenna systems have, for a variety of reasons, proven generally unsatisfactory for satellite surveillance purposes.

Customarily, compound radio interferometer surveillance systems utilize the reflections from the satellite of a surface initiated cw signal, although it is obvious that a satellite initiated signal could also be used. The signal from the satellite arrives as a plane wave at the receiving portion of the compound interferometer, which portion essentially consists of a plurality of spaced antennas. Because of the possibility of ambiguity, the analysis and interpretation of the interferometer signals is tedious and time consuming when done manually and when automatically accomplished has hitherto required complex computing circuitry, such as disclosed in patent application Serial No. 854,072, filed November 19, 1959 by Maxime G. Kaufman and Leonard O. Hayden, now Patent No. 3,125,756, and in patent application Serial No. 277,059, filed April 30, 1963 by Maxime G. Kaufman and Donald W. Lynch, now Patent No. 3,217,326.

It is an object of this invention to provide means which automatically produce an accurate indication of the position of a satellite.

Another object is the provision of relatively simple electronic means which automatically produce an accurate indication of the elevation angle of a satellite.

A further object of the present invention is to provide an electronic modulation system for use with a compound radio interferometer which will combine a plurality of interferometer signals to produce a relatively noise free, single signal, the phase of which is unambiguously indicative of the angle of arrival of electromagnetic energy from a satellite.

These and other objects will hereinafter more fully appear and will be more particularly pointed out in the following detailed description of the invention when considered in conjunction with the accompanying drawing wherein:

In the single figure drawing there is illustrated a block diagram of a representative embodiment of the invention.

The satellite S is illustrated as being the source of a plane wave P. This wave may either originate in the satellite or be a reflection of a ground initiated signal and is typically of a 108 mc. frequency. Because of the great height of the satellite, as compared to the baseline distance D between the antennas 10 and 11, the rays in wave P are essentially parallel.

When the satellite is directly overhead, the rays arriving at antennas 10 and 11 are in phase, but when the satellite S is located at an angle $\theta$ with the vertical direction Z, as illustrated, it is clear that the wave P will arrive at the antenna 11 before arriving at antenna 10 and that the electrical phase of the wave energy arriving at these antennas will depend on the angle $\theta$ and the distance D. It is also clear that the precision of measurement of angle $\theta$, also called the resolution, will improve with an increase in the baseline D.

For a variety of reasons known in the prior art, of which the elimination of ambiguity is paramount, it is necessary for the surveillance system to include a plurality of pairs of antennas, each pair being separated by a baseline distance which is a different multiple of slightly less than one-half the wavelength. The possibility of ambiguities would arise for baseline distances of multiples of exactly one-half the wavelength. Typically such baselines could be 16, 20, 52 and 60 feet for the 108 mc. frequency mentioned in describing the illustrated embodiment of the invention, but it is to be recognized that the 108 mc. frequency is only for purpose of illustration and could be many orders of magnitude above or below this frequency.

As described more fully in application Serial No. 277,059, the energy received by antennas 10 and 11 is converted by phase comparator and receiver 12 into a 1 kc. signal. This signal and three other 1 kc. signals from other pairs of antennas are received by resolvers 13, 14, 15 and 16. The function of these resolvers is to phase shift the 1 kc. signals to compensate for any undesired phase shifts which might be introduced by the transmission lines or by the receiver and phase comparator circuits. These resolver output signals each have a phase relationship to the output of the 1 kc. reference oscillator 17 which is representative of the phase difference of the energy received by the antennas in each pair. The output of reference oscillator 17 is reduced to 100 c.p.s. by divider 18 and is used to energize multiplier 19. The outputs of resolvers 13, 14, 15 and 16 and of multiplier 19 are combined by modulators 20, 21, 22 and 23 to provide signals which are frequency related to the baseline distances.

Frequency stabilization and the resulting negligible phase shift in the modulators is obtained by use of precision oscillator 17 and is necessary to maintain the initial phase relationships from the antennas. Accordingly, all of the modulators 20, 21, 22 and 23 derive their mixing signals from the 1 kc. precision reference oscillator 17.

As a result of the described frequency stabilization technique and of the relationship between the baseline distances of 16, 20, 52 and 60 feet and the associated frequencies of 400, 500, 1300 and 1500 c.p.s. of the output of modulators 20, 21, 22 and 23, the output of these modulators are phase coherent signals which can be expressed as:

$$\left.\begin{array}{l}e_{20}=E_{20}\sin\ 4(wt+\phi)\\ e_{21}=E_{21}\sin\ 5(wt+\phi)\\ e_{22}=E_{22}\sin\ 13(wt+\phi)\\ e_{23}=E_{23}\sin\ 15(wt+\phi)\end{array}\right\} \quad \text{Equation (1)}$$

where $\phi$ is the phase difference in energy which would be received by a pair of antennas located 4 feet, or slightly less than one-half wavelength, apart and sin wt is an equivalent expression for 100 c.p.s.

Surveillance systems similar to the system described above are known in the prior art and are more fully described in the previously mentioned patent applications. The surveillance systems previously known have utilized complex computer circuitry to evaluate the Equation 1 and determine the satellite position as defined by the angle $\theta$. The present invention in contrast, provides an accurate, unambiguous indication of the satellite position by means of relatively simple modulating circuitry wherein the signal-to-noise ratio is much improved over prior art systems because of the modulation process.

Modulator 24 is a conventional modulator, such as a ring type, and is connected to receive the 400 and 500 c.p.s. outputs of modulators 20 and 21 and provides a frequency difference output signal which can be expressed:

$$e_{24}=E_{24} \sin (5-4)(wt+\phi) \quad \text{or}$$
$$e_{24}=E_{24} \sin (wt+\phi) \quad \text{Equation (2)}$$

Similarly, modulator 25 is a conventional modulator, such as a ring type, and is connected to receive the 1.3 and 1.5 kc. outputs of modulators 22 and 23 and provides a frequency difference output signal which can be expressed:

$$e_{25}=E_{25} \sin (15-13)(wt+\phi) \quad \text{or}$$
$$e_{25}=E_{25} \sin 2(wt+\phi) \quad \text{Equation (3)}$$

Modulator 26 is connected to receive the outputs of modulators 24 and 25 and may be similar to these modulators. The modulator 26 provides a frequency difference output signal which can be expressed:

$$e_{26}=E_{26} \sin (2-1)(wt+\phi) \quad \text{or}$$
$$e_{26}=E_{26} \sin (wt+\phi) \quad \text{Equation (4)}$$

The 100 c.p.s. output of divider 18, which is the electrical reference for the described surveillance system, can be expressed:

$$e_0=E_0 \sin wt \quad \text{Equation (5)}$$

It should be noted that the outputs of modulators 20, 21, 22 and 23, as expressed in Equations 1, and of modulators 24, 25 and 26, as expressed in Equations 2, 3 and 4, have preserved in the electrical angle $\phi$, or multiples thereof, the electrical phase information which is related, through the incident phase difference of the wave P at the antenna pairs, to the physical angle $\theta$ of satellite S.

Note should also be taken that electrical angle $\phi$ is representative of the phase difference of energy which would be received by antennas located 4 feet, or slightly less than one-half wavelength, apart. It will be obvious that, because of coupling problems, a pair of antennas located slightly less than one-half wavelength apart is not practical and would also provide extremely poor resolution and low signal-to-noise ratio. However, the signal from such an antenna pair would be unambiguously related to the angle $\theta$ of the satellite.

Mathematically it would seem that, for the purposes of measuring the angle $\phi$, which is analogous to the satellite angle $\theta$, the output of modulator 24, Equation 2, and the output of modulator 26, Equation 4, would be equivalent. However, as a practical matter, this equivalence does not exist. As a result of the longer baselines of the antenna pairs associated with modulators 22 and 23, and the accompanying higher resolution, and because of the improved signal-to-noise ratio resulting from the modulation process, the signal from modulator 26 has been found to be much superior in accuracy and signal-to-noise ratio to the signal from modulator 24. Further, while for the sake of simplicity, only four antenna pairs have been described, it is obvious that a larger number of antenna pairs, together with additional stages of modulation, could be used.

Phase meter 27 is connected to receive the output of modulator 26, Equation 4, and the 100 c.p.s. reference signal from divider 18, Equation 5. The phase meter 27 indicates the phase difference between the two inputs, which is of course the electrical angle $\phi$ and which is analogous to the angle $\theta$ of the satellite. The indication of phase meter 27 may be either analog or digital and, if desired, recorded by recorder 28 or utilized by a computer 29. Both the phase meter 27 and recorder 28 may be any of the many suitable instruments of this kind commercially available.

The surveillance system described and illustrated will provide an accurate, unambiguous, relatively noise-free indication of a satellite's angular location. However, it should be understood, of course, that the foregoing disclosure relates to only a preferred embodiment of the invention and that numerous modifications or alterations may be made therein without departing from the spirit and scope of the invention as set forth in the appended claims.

What is claimed is:
1. In a satellite surveillance system which includes a radio interferometer and a source which produces a reference signal;
 modulating means connected to receive a plurality of signals from said ratio interferometer and a plurality of stable, frequency-multiplied signals from said reference signal source, said modulating means including successive stages of modulating wherein each stage after the first has a lesser number of modulators than the preceding stage and the last stage produces a single signal having the same frequency as said reference signal, and
 phase measuring means connected to said source and to said modulating means.
2. In a satellite surveillance system wherein a high frequency signal is received from the satellite by a plurality of pairs of antennas, each pair of antennas being separated by different distances which are integral multiples of a distance which is slightly different than one-half the wavelength of said high frequency signal;
 generating means to produce a reference signal of a fixed frequency;
 converting means connected to said plurality of pairs of antennas to convert the high frequency signals received by said antennas into a plurality of signals wherein each signal is of a frequency that is an integer multiple of said fixed frequency and is frequency related to the distance between one of said plurality of pairs of antennas and is phase related to the phase difference of the high frequency signal arriving at the antennas in the same one of said pairs of antennas;
 modulating means including successive stages of modulation wherein each stage after the first has a lesser number of modulators than the preceding stage, said modulating means being connected to said converter means and producing a single signal of the same frequency as said fixed frequency and having a phase related to the angular position of said satellite, and
 phase measuring means connected to said generating means and to said modulating means to indicate the angular position of said satellite.
3. In a satellite surveillance system as set forth in claim 2, a computer connected to said phase measuring means.
4. In a satellite surveillance system as set forth in claim 2, a recorder connected to said phase measuring means.
5. In a satellite surveillance system as set forth in claim 2 wherein said generating means includes a precision oscillator and said fixed frequency is related to a distance which is slightly different than one-half the wavelength of said high frequency signal.

References Cited by the Examiner

UNITED STATES PATENTS 2,781,450   2/1957   Ianouchewsky _____ 331—38
3,012,244   12/1961  Langenwalter et al.

OTHER REFERENCES

Mengel, "Tracking the Earth Satellite, and Data Transmission, by Radio," Proceedings of the I.R.E., June 1956, pp. 755–760.

CHESTER L. JUSTUS, *Primary Examiner.*

R. E. BERGER, *Assistant Examiner.*